(12) United States Patent
Lau et al.

(10) Patent No.: US 11,948,613 B2
(45) Date of Patent: Apr. 2, 2024

(54) SERVO CONTROLLER BLENDING

(71) Applicant: Seagate Technology LLC, Fremont, CA (US)

(72) Inventors: Chan Fan Lau, Singapore (SG); Dong Wook Lee, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 29 days.

(21) Appl. No.: 17/840,921

(22) Filed: Jun. 15, 2022

(65) Prior Publication Data

US 2023/0410842 A1    Dec. 21, 2023

(51) Int. Cl.
*G11B 5/596* (2006.01)
*G11B 5/54* (2006.01)
*H02P 25/034* (2016.01)

(52) U.S. Cl.
CPC .......... *G11B 5/59666* (2013.01); *G11B 5/54* (2013.01); *G11B 5/59688* (2013.01); *H02P 25/034* (2016.02); *G11B 2220/2516* (2013.01)

(58) Field of Classification Search
None
See application file for complete search history.

(56) References Cited

U.S. PATENT DOCUMENTS

| | | | |
|---|---|---|---|
| 6,320,721 B1 * | 11/2001 | Magee | G11B 5/5547 360/78.09 |
| 6,373,650 B1 * | 4/2002 | Pedrazzini | G11B 21/12 318/560 |
| 6,683,833 B2 * | 1/2004 | Dekker | G11B 7/0956 |
| 6,687,081 B1 * | 2/2004 | O'Hara | G11B 5/5547 360/78.07 |
| 9,460,742 B1 | 10/2016 | Shan et al. | |
| 9,959,896 B1 * | 5/2018 | Lin | G11B 7/08582 |
| 10,803,892 B1 | 10/2020 | Hill et al. | |
| 11,120,825 B1 | 9/2021 | Sosseh et al. | |
| 2002/0101681 A1 * | 8/2002 | He | G11B 5/4873 |
| 2003/0076616 A1 * | 4/2003 | Hsin | G11B 5/59622 360/75 |

* cited by examiner

*Primary Examiner* — Peter Vincent Agustin
(74) *Attorney, Agent, or Firm* — Faegre Drinker Biddle & Reath LLP

(57) ABSTRACT

A method includes generating a first control signal and a second control signal; blending the first control signal and the second control signal based, at least in part, on a velocity; and positioning a read/write head based on the blending of the first control signal and the second control signal.

18 Claims, 5 Drawing Sheets

SERVO CONTROLLER BLENDING

SUMMARY

In certain embodiments, a method includes generating a first control signal and a second control signal; blending the first control signal and the second control signal based, at least in part, on a velocity; and positioning a read/write head based on the blending of the first control signal and the second control signal.

In certain embodiments, a data storage device includes a servo control system with a voice coil motor (VCM) controller and a micro-actuator controller. The VCM controller is programmed to generate a VCM control signal, and the micro-actuator controller is programmed to generate a micro-actuator control signal that is combined with the VCM control signal. The micro-actuator control signal is modified based, at least in part, on a programmed seek velocity.

In certain embodiments, data storage device includes a servo control system including a VCM controller and a micro-actuator controller. The VCM controller is programmed to generate a VCM control signal, and the micro-actuator controller is programmed to generate a micro-actuator control signal that is combined with the VCM control signal. A proportion of the micro-actuator control signal being combined is based, at least in part, on a reference seek velocity. The data storage device further includes read/write heads arranged to be positioned based on the VCM control signal and the micro-actuator control signal.

In certain embodiments, a system-on-a-chip includes a voice coil motor (VCM) control module programmed to generate a VCM control signal, a micro-actuator control module programmed to generate a micro-actuator control signal, a first blending multiplier arranged to modify an input to the micro-actuator control module, and a second blending multiplier arranged to modify the VCM control signal. The first blending multiplier and the second blending multiplier are configured to control combination of the VCM control signal and the micro-actuator control signal.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
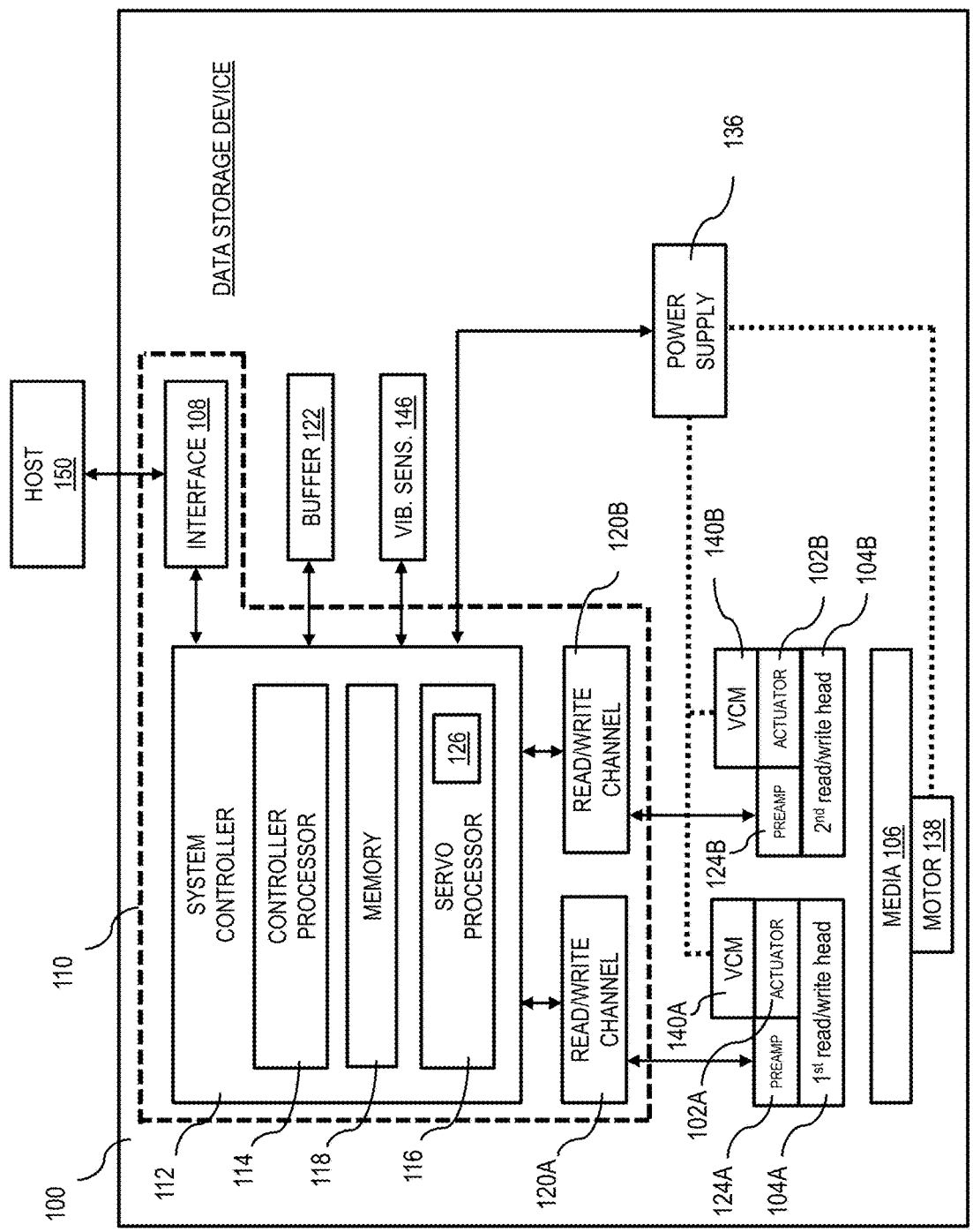
FIG. 1 shows a block diagram of a data storage device, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Data storage devices such as hard disk drives use servo control systems to position actuators and microactuators. The actuator and microactuators are controlled so that read/write heads coupled to the actuators and microactuators are positioned above desired data tracks for carrying out data reading and writing operations. Servo control systems may manage the amount of current or voltage supplied to one or more voice coil motor (VCM) assemblies and microactuators. At certain times, the VCM assemblies may be managed by one controller (such as a module primarily used for track seeking operations), and the microactuators may be managed by a different controller (such as a module primarily used for track following operations).

When the read/write heads seek to a target data track and are near to reaching the target data track, servo control systems can begin using a dual-stage or dual-controller mode. Sometimes this is called track settling. In a dual-controller mode, the track seeking controller and the track follow controller are used simultaneously to position the read/write heads. During the dual-controller mode, servo control systems can blend the respective outputs of the two controllers such that the output of the microactuator controller is an input to controlling both the VCM assemblies and microactuators. If this blending transition starts too late, it could take longer to settle onto the desired track. But if the transition starts too early, the microactuators are more likely to saturate and be unable to meet the required positioning commands.

Certain embodiments of the present disclosure are accordingly directed to methods and devices for blending outputs of and transitioning between controllers of servo control systems.

Data Storage Devices

FIG. 1 shows a schematic of a data storage device 100 such as a hard disk drive. In the case of a hard disk drive, the data storage device 100 can include a single actuator or multiple actuators (i.e., a first actuator 102A and a second actuator 102B) each with one or more read/write heads 104A and 104B to provide concurrent access to magnetic recording media 106 (e.g., magnetic recording disks, which are referred to as a magnetic recording medium in singular form). In certain embodiments, the multiple actuators 102A and 102B share a common pivot axis and are positioned in a stacked arrangement. In such embodiments, the read/write head(s) 104A coupled to the first actuator 102A access different surfaces of the magnetic recording media 106 than the read/write head(s) 104B coupled to the second actuator 102B. In other embodiments, the multiple actuators 102A and 102B have separate pivot axes. In such embodiments, the read/write head(s) 104A coupled to the first actuator 102A can access the same magnetic recording medium 106 as the read/write head(s) 104B coupled to the second actuator 102B. Although only two actuators for the data storage device 100 are shown in FIG. 1, additional actuators can be incorporated into the data storage device 100 or the data storage device 100 may have only one actuator. Embodiments of the present disclosure can be used with single-actuator and multi-actuator approaches.

The data storage device 100 includes an interface 108 (e.g., an input/output interface) for transferring data to and from the data storage device 100. For example, the interface 108, among other features, can be communicatively coupled between a host 150 (e.g., a laptop or a data storage system such as a server) and the read/write heads 104A and 1046 to facilitate communication, using a standardized communication protocol (e.g., SATA, SAS, SCSI), between the read/write heads 104A and 104B and the host 150.

The data storage device 100 can include a system on a chip ("SOC") 110 (shown in dashed lines) that includes a system controller 112, which can include a controller processor 114 (e.g., a microprocessor), a servo processor 116 (e.g., a microprocessor), and memory 118 coupled to the controller processor 114 and the servo processor 116. The SOC 110 can include multiple distinct banks of memory. For example, one bank of memory 118 can be dedicated to the controller processor 114 and its functions while another bank of memory 118 can be dedicated to the servo processor 116 and its functions (e.g., the memory 118 and the servo processor 116 together functioning as a servo controller). The interface 108 may also be part of the SOC 110.

The SOC 110 can also include one or more read/write channels 120A and 120B, which encode data associated with write commands and with read commands. The SOC 110 may be an integrated circuit such as an application-specific integrated circuit ("ASIC") and field-programmable gate array ("FPGA") that includes instructions (e.g., in the form of firmware) for carrying out various functions of the data storage device 100. For example, the SOC 110 can include circuitry to control and carry out various aspects of the data storage device 100 as described in more detail below. Although the interface 108, system controller 112, etc., are shown as being part of a single SOC, the components and their functions can be distributed among several integrated circuits. The system controller 112 can be coupled to and control access to a buffer 122, which can temporarily store data associated with read commands and write commands. The buffer 122 can be a volatile memory, such as a dynamic random access memory ("DRAM"), static random access memory ("SRAM"), or other volatile memory.

During operation, the data storage device 100 receives various data transfer commands (e.g., a read command or a write command) from the host 150. Data associated with a write command may be received from the host 150 by the interface 108 and initially stored to the buffer 122. The data is encoded or otherwise processed by respective read/write channels 120A or 120B and eventually stored to the magnetic recording media 106 via one of the read/write heads 104A or 104B coupled to the respective first actuator 102A or the second actuator 1026. Data associated with a read command may be retrieved from the magnetic recording media 106 and stored in the buffer 122. Such data is then transferred to the host 150 by the interface 108.

Servo Control System

Figure 2:
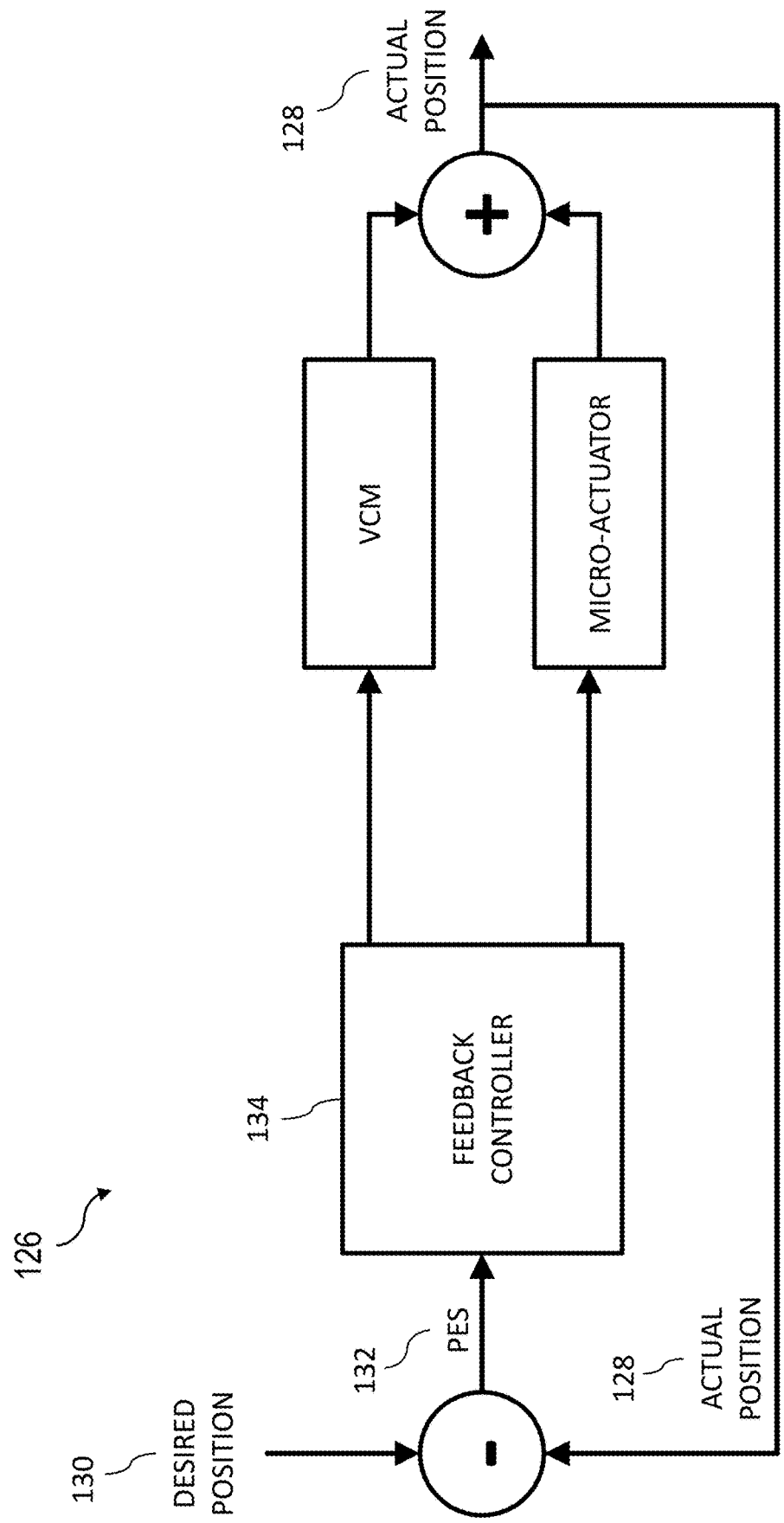
FIG. 2 shows a diagram of a servo control system, in accordance with certain embodiments of the present disclosure.
Figure 3:
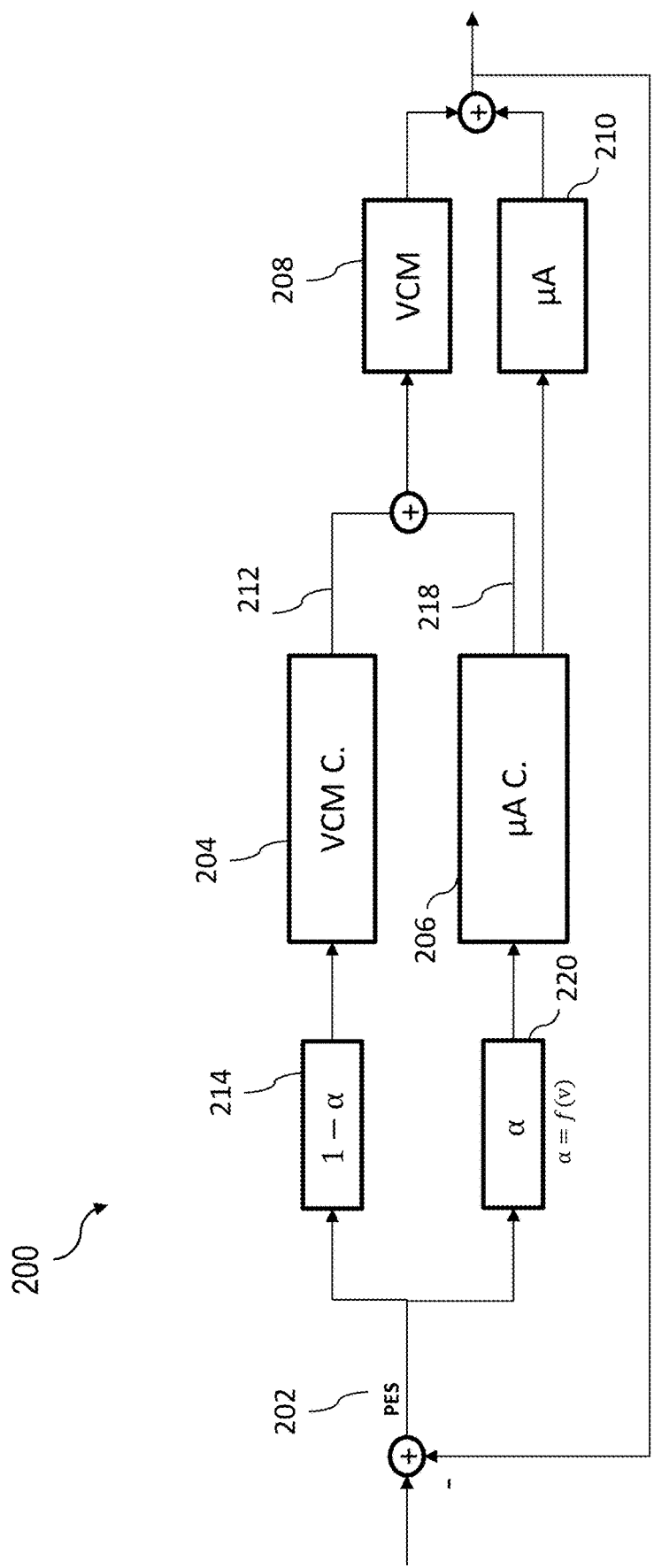
FIG. 3 shows another diagram of a servo control system, in accordance with certain embodiments of the present disclosure.
Figure 4:
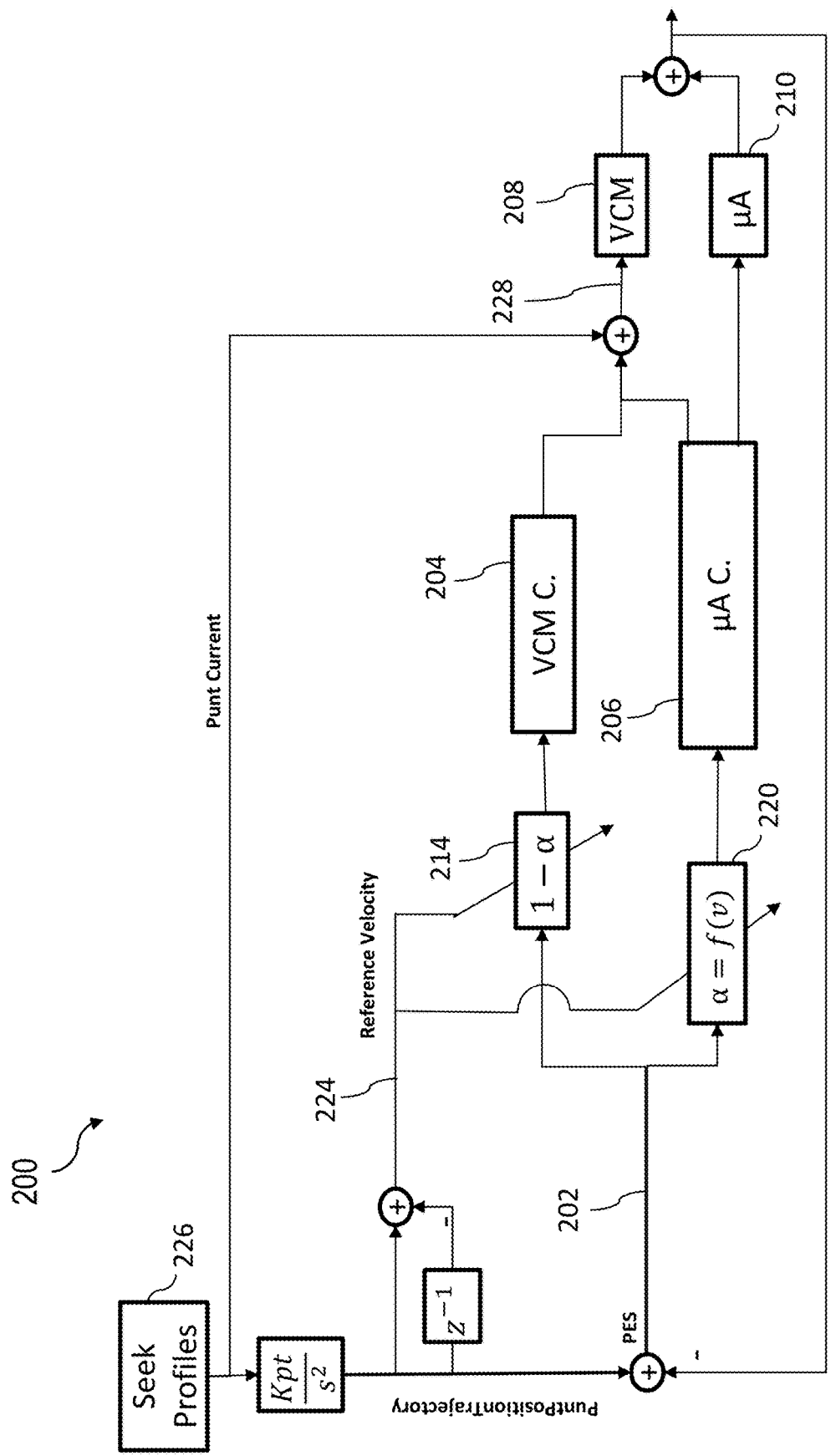
FIG. 4 shows a more detailed diagram of a servo control system of FIG. 3, in accordance with certain embodiments of the present disclosure.

The data storage device 100 includes a servo control system 126 (an example of which is schematically shown FIG. 2) that is carried out by components of the system controller 112 (e.g., the servo processor 116 and one or more banks of the memory 118). A more detailed schematic of a servo control system is shown in FIGS. 3 and 4, which are described in a later section.

In operation, the read/write heads 104A and 1046 read the positioning data from servo sectors stored on the magnetic recording media 106. The read positioning data is processed to determine an actual position 128 (shown in FIG. 2) of the read/write heads 104A and 1046 relative to tracks on the magnetic recording media 106. The actual position 128 of the read/write heads 104A and 1046 is subtracted from a desired position 130 of the read/write heads 104A and 104B to determine a position error signal (PES) 132, which is the difference between where the read/write heads 104A and 1046 are and should be positioned. The PES 132 is fed into one or more feedback controllers 134, which control current to at least one of the VCM assemblies 140A, 140B and—for some operations—controls voltage to microactuators to position the read/write heads 104A and 104B over the desired track. The microactuators can include elements formed of lead-zirconate-titanate (PZT) and, as such, may extend (e.g., lengthen) in response to a positive applied voltage or contract (e.g., shorten) in response to a negative applied voltage. In certain configurations, when one of the PZT elements extends and the other PZT element shortens or maintains its length, one of the read/write heads 104A and 1046 will pivot.

As shown in FIG. 1, the data storage device 100 includes a power supply 136, (e.g., an amplifier) which is controlled by the system controller 112. The power supply 136 supplies current to a motor 138 (e.g., spindle motor), which rotates the magnetic recording media 106. The power supply 136 also supplies current to VCM assemblies 140A and 140B. In certain embodiments, the power supply 136 is an integrated circuit, which includes electronics (e.g., voice coil driver electronics) designed to provide current to the VCM assemblies 140A and 140B.

The VCM assemblies 140A and 140B are used to position (e.g., rotate) the actuators 102A and 1026 to position the read/write heads 104A and 1046 over a desired data track on the magnetic recording media 106 for data reading and data writing operations. For example, in response to a command to read data from or write data to a data track located a certain distance away from where a respective read/write head 104A or 104B is currently positioned (i.e., a track-seeking operation), a current may be supplied by the power supply 136 and applied to the voice coil of the respective VCM assemblies 140A and 140B to rotate the respective actuators 102A and 102B (and therefore the respective read/write heads 104A and 1046) towards the desired data track. The applied current through the voice coil generates a magnetic field that interacts with magnets of the VCM assemblies 140A and 140B. The applied current may follow a current profile determined by and commanded by the servo processor 116. As the respective read/write heads 104A and 104B near the desired data track, less current is applied to the VCM assemblies 140A and 140B such that the read/write heads 104A and 104B decelerate and begin to settle over the desired data track (i.e., a track-settling operation). Once the respective read/write heads 104A and 1046 are positioned over the desired data track, the servo control system 126 compensates for small positioning errors (i.e., a track-following operation) to keep the desired read/write heads 104A and 1046 over the desired data tracks on the magnetic recording medium 106 during a read operation or a write operation.

Blending of Controllers

As noted above, when the read/write heads seek to a target data track and are near to reaching the target data track, servo control systems can begin to blend respective outputs of the controllers. However, if the blending transition starts too late, it could take longer to settle onto the desired track. But if the blending transition starts too early, the microactuators are more likely to saturate. Certain embodiments of the present disclosure are accordingly directed to methods and devices for blending outputs of and transitioning between controllers of servo controls systems.

FIG. 3 shows a servo control system 200 featuring separate controllers for controlling the VCM assemblies and microactuators. The servo control system 200 can be utilized in the data storage device 100 of FIG. 1. In embodiments, the controllers can be separate modules within a servo control system that are executed by the servo processor/system controller/SOC of FIG. 1.

The servo control system 200 shown in FIG. 3 uses PES 202 as an input (directly or indirectly) to at least two controllers (e.g., feedback controllers): a VCM controller 204 (or single-stage controller) and a microactuator controller 206 (or multi-stage controller). In certain instances, the VCM controller 204 may be referred to as a track seek controller, and the microactuator controller 206 may be referred to as a track follow controller.

The VCM controller 204 controls current to the one or more VCM assemblies 208 (e.g., current to voice coils in the VCM assemblies 208), and the microactuator controller 206 controls voltage to microactuators 210 to position read/write heads over the desired track. For example, the PES 202 is inputted (directly or indirectly) to the VCM controller 204, which generates a VCM control signal 212 that assists with controlling current applied to the voice coil used to rotate the actuator. In the example of FIG. 3, the PES is first inputted to a multiplier 214 (e.g., a blending multiplier). As shown in FIG. 3, the multiplier 214 is denoted with an equation (1−α). Calculating α and use of the multiplier 214 is described in more detail when discussing FIG. 4. In short, use of α and the multiplier 214 determines the extent of the blending transition between controllers. When α is zero, no blending occurs. The variable α can be referred to as a blending multiplier.

The PES 202 is also inputted—indirectly in the example of FIG. 3—to the microactuator controller 206, which generates a microactuator control signal 218 that assists with controlling voltage applied to the microactuator (e.g., PZT elements of the microactuator) for pivoting the read/write heads. As shown in FIG. 3, the PES 202 is first inputted to a multiplier 220 (e.g., a blending multiplier), the output of which is inputted to the microactuator controller 206. When a is greater than zero, the micro-actuator control signal 218 is combined with the VCM control signal 212 to generate a blended control signal. The blended control signal controls positioning of the VCM 208.

FIG. 4 shows a more detailed schematic of the servo control system 200. As shown in FIG. 4, one input to the multipliers 214 and 220 is a reference velocity 224 generated in response to a seek profile 226, which is sometimes referred to as a seek table. Seek profiles 226 provide a profile of current (e.g., level of current over time) used to accomplish a given track seek operation. For example, seek profiles 226 dictate baseline acceleration and deceleration of the VCM assembly—although the actual position signals applied can vary in response to PES, sensed vibration, etc. Each seek profile 226 may be associated with a given range of seek lengths. One seek profile 226 may be used for track seek operations that seek 2,000-3,000 data tracks (e.g., moving from one data track to another that is 2,000 to 3,000 data tracks away from each other), while another seek profile 226 may be used for track seek operations that seek 10,000-11,000 data tracks away, and so on. Some seek profiles 226 may be used solely for write operations and others may be used solely for read operations.

Because the reference velocity 224 is an input to the multipliers 214 and 220, the value of α (the blending multiplier) is based at least in part on the reference velocity 224, which is based on a given seek profile 226.

There are multiple approaches for determining the value of the blend multiplier α—which can range from 0 to 1. In certain embodiments, the approach for determining the value of α depends on a length of the seek. For example, one approach can be used for seek operations considered to be short seeks while another approach can be used for seek operations considered to be long seeks. In certain embodiments, a seek operation is considered to be a short seek if the length of the seek is less than 20,000 tracks. In other embodiments, the timing of when the blending starts depends on an estimated timing of the seek operation. For example, if a seek-portion of an operation is expected to take a certain amount of time, the blending can begin when the seek-portion is estimated to be completed.

The first approach described below can be used for short seek operations, and the second approach can be used for longer seeks. In the first approach, α is determined by the following equation:

$$\alpha = f(v) = \text{MIN\_VALUE} + \cos\left(\frac{(1 - r(v))\pi + 1}{2}\right) \times (1 - \text{MIN\_VALUE}),$$

$$\text{where } r(v) = \frac{\text{SS\_THRESHOLD} - v}{\text{SS\_THRESHOLD} - \text{DS\_THRESHOLD}}$$

The "MIN_VALUE" is a non-zero number that is less than 1 and that is set such that the seek operation will always have some level of blending of controllers (e.g., in a dual-stage control or dual-controller mode).

The "DS_THRESHOLD" represents a velocity that is set such that any lower velocity (v) will result in full dual-stage control.

The "SS_THRESHOLD" represents a velocity that is set such that it will always be lower than a peak velocity of the longest short-seek profile. When the seek velocity is higher than this threshold, the value of α will reach the MIN_VALUE.

As can be seen, as velocity decreases, the value for the blending multiplier a increases such that the proportion of the microactuator control signal increases. Further, the value of α includes a minimum, static component (e.g., MIN_VALUE) and a dynamic component that varies based on velocity.

In the second approach, α is determined by the following equation:

$$\alpha = f(v) = \begin{cases} 0, & \text{during acceleration or coasting period} \\ \cos\left(\frac{(1 - r(v))\pi + 1}{2}\right), & \text{during deceleration} \end{cases}$$

$$\text{where, } r(v) = \frac{\text{SS\_THRESHOLD} - v}{\text{SS\_THRESHOLD} - \text{DS\_THRESHOLD}}$$

In this second approach, the seek operation starts without any controller blending (e.g., α=0) such that only single-stage control is used (e.g., control by only the VCM controller 204). The value for α remains at 0 (e.g., in single-stage control) during acceleration and coasting phases of the seek operation. Acceleration occurs at the beginning of a track seeking operation. The coasting phase is a phase with constant velocity and therefore without acceleration or deceleration.

Once deceleration begins, the controller blending begins and the blending multiplier α becomes non-zero and is based on seek velocity, as described above with respect to short seek operations. In certain embodiments, the values for SS_THRESHOLD and DS_THRESHOLD are the same for both short seeks and long seeks.

Using the approaches above, the blending transition between controllers is based, at least in part, on a current seek velocity. In embodiments, the current seek velocity is a reference seek velocity as opposed to an actual velocity. The proportion of the blending is dynamically modified based on the seek velocity. During the transition, the respective outputs of the controllers are "blended" such that the output of the micro-actuator controller is an input to controlling both the VCM and the micro-actuator. Put another way, once α is greater than zero, the micro-actuator control signal 218 is combined with the VCM control signal 212 to generate a blended control signal 228, which controls positioning of the VCM 208. In certain embodiments, the blending transition is also based on PES.

Figure 5:
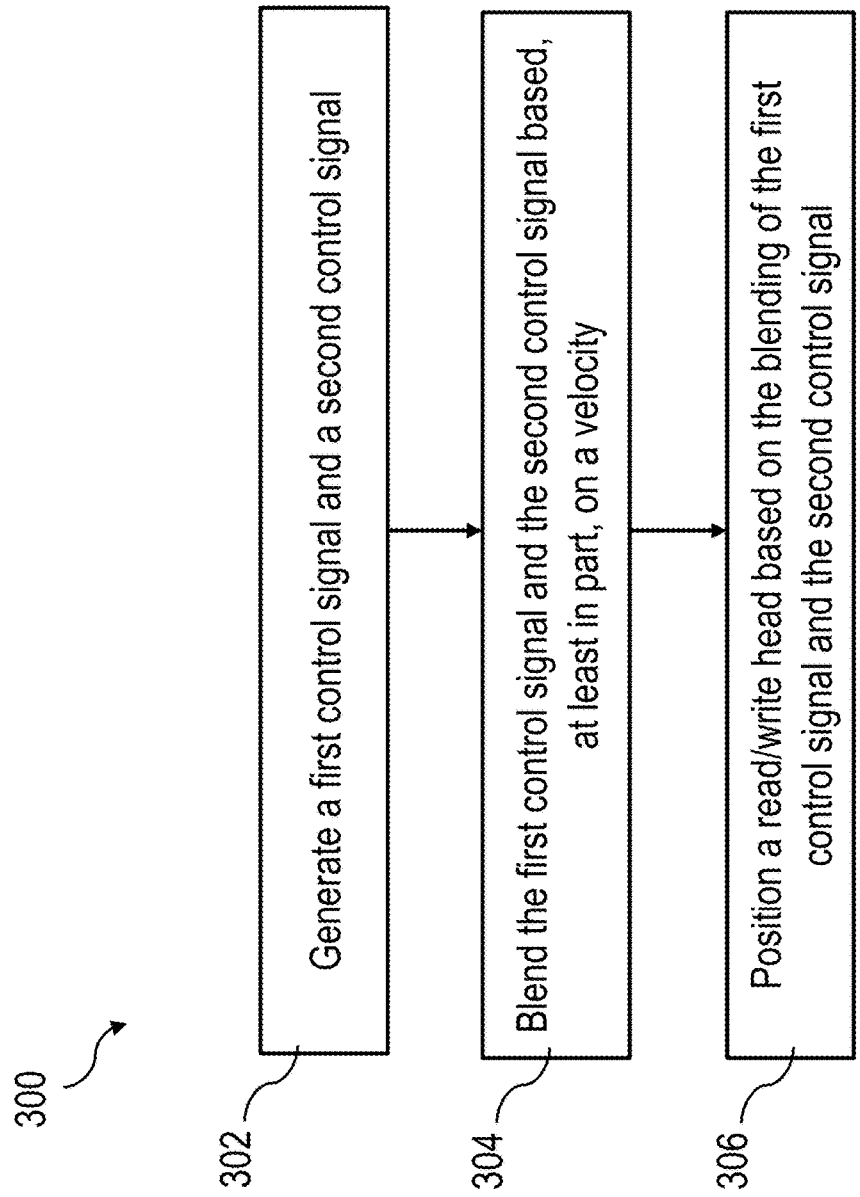
FIG. 5 shows a block diagram of steps of a method, in accordance with certain embodiments of the present disclosure.

FIG. 5 shows a method 300 for positioning a read/write head using blended control signals. The method 300 includes generating a first control signal and a second control signal (block 302 in FIG. 5). The method 300 further includes blending the first control signal and the second control signal based, at least in part, on a velocity (block 304 in FIG. 5). The method 300 further includes positioning a read/write head based on the blending of the first control signal and the second control signal (block 306 in FIG. 5).

Aspects of the present disclosure are described with reference to flowchart illustrations and/or block diagrams of methods, devices, systems and computer program products. It will be understood that each block of the flowchart illustrations and/or block diagrams, and combinations of blocks in the flowchart illustrations and/or block diagrams, can be implemented by computer program instructions stored to memory. In instances, the memory includes computer-readable media in the form of volatile and/or nonvolatile memory and may be removable, nonremovable, or a combination thereof. In instances, the memory stores computer-executable instructions for causing a processor (e.g., microprocessor) to implement aspects of instances of components discussed herein and/or to perform aspects of instances of methods and procedures discussed herein. The memory can comprise a non-transitory computer readable medium storing the computer-executable instructions. The computer-executable instructions may include, for example, computer code, machine-useable instructions, and the like such as, for example, program components capable of being executed by one or more processors. Program components may be programmed using any number of different programming environments, including various languages, development kits, frameworks, and/or the like. Some or all of the functionality contemplated herein may also, or alternatively, be implemented in hardware and/or firmware. According to instances, for example, the instructions may be configured to be executed by the processor(s) and, upon execution, to cause the processor to perform certain processes. In certain instances, the processor, memory, and instructions are part of a controller such as an application specific integrated circuit (ASIC), field-programmable gate array (FPGA), and/or the like. Such devices can be used to carry out the functions and steps described herein.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:
1. A method comprising:
generating a first control signal;
generating a second control signal;
blending the first control signal and the second control signal based, at least in part, on a velocity, wherein a proportion of the second control signal increases as the velocity decreases; and
positioning a read/write head based on the blending of the first control signal and the second control signal.
2. The method of claim 1, wherein the first control signal is a voice coil motor control signal, wherein the second control signal is a micro-actuator control signal.
3. The method of claim 1, wherein the velocity is a reference velocity.
4. The method of claim 3, wherein the reference velocity is based on a predetermined seek profile.
5. The method of claim 4, wherein the predetermined seek profile is used to generate a reference amount of current over time.
6. The method of claim 1, wherein the blending is based on a predetermined equation.
7. The method of claim 6, wherein the equation includes a fixed component and a variable component.
8. The method of claim 7, wherein the variable component is based on the velocity.
9. A data storage device comprising:
a servo control system including a voice coil motor (VCM) controller and a micro-actuator controller, the VCM controller is programmed to generate a VCM control signal, the micro-actuator controller is programmed to generate a micro-actuator control signal that is combined with the VCM control signal, wherein a proportion of the micro-actuator control signal being combined is based, at least in part, on a reference seek velocity; and
read/write heads arranged to be positioned based on the VCM control signal and the micro-actuator control signal.
10. The data storage device of claim 9, wherein the reference velocity is based on a predetermined seek profile.
11. The data storage device of claim 10, wherein the predetermined seek profile is one of multiple seek profiles stored in a library of seek profiles.
12. The data storage device of claim 9, wherein the proportion of the micro-actuator control signal increases as the reference seek velocity decreases.
13. The data storage device of claim 9, wherein the VCM control signal and the micro-actuator control signal are combined to generate a blended control signal, wherein the read/write heads are arranged to be positioned based on the blended control signal.
14. The data storage device of claim 9, wherein the VCM controller and the micro-actuator controller are feedback controllers.

15. The data storage device of claim 9, wherein the proportion becomes non-zero after a predetermined amount of time.

16. The data storage device of claim 9, wherein the proportion is controlled by a blending multiplier.

17. A system-on-a-chip (SOC) comprising:
a voice coil motor (VCM) control module programmed to generate a VCM control signal;
a micro-actuator control module programmed to generate a micro-actuator control signal;
a first blending multiplier arranged to modify an input to the micro-actuator control module;
a second blending multiplier arranged to modify the VCM control signal, wherein the first blending multiplier and the second blending multiplier are configured to control combination of the VCM control signal and the micro-actuator control signal, wherein a proportion of the combination of the VCM control signal and the micro-actuator control signal is based on a velocity.

18. The SOC of claim 17, wherein the velocity is a reference seek velocity.

\* \* \* \* \*